(12) United States Patent
Liao

(10) Patent No.: US 6,774,603 B2
(45) Date of Patent: Aug. 10, 2004

(54) MULTI-FUNCTION CHARGER

(76) Inventor: Sheng Hsin Liao, No. 10, Alley 38, Lane 229, San Chun St., Shulin City, Taipei Hsien (TW)

( * ) Notice: Subject to any disclaimer, the term of this patent is extended or adjusted under 35 U.S.C. 154(b) by 0 days.

(21) Appl. No.: 10/053,604

(22) Filed: Jan. 24, 2002

(65) Prior Publication Data

US 2003/0117104 A1 Jun. 26, 2003

(30) Foreign Application Priority Data

Dec. 25, 2001 (TW) .................................. 90222775 U

(51) Int. Cl.$^7$ ................................................. H02J 7/00
(52) U.S. Cl. ..................................... 320/107; 320/112
(58) Field of Search ............................... 320/107, 112, 320/113, 114, 115, 103; 307/64, 66, 70; 429/90, 97, 98, 99, 100

(56) References Cited

U.S. PATENT DOCUMENTS

| | | | | |
|---|---|---|---|---|
| 5,631,101 A | * | 5/1997 | Amero, Jr. .................... | 429/90 |
| 5,933,812 A | * | 8/1999 | Meyer et al. .................. | 705/15 |
| 5,977,747 A | * | 11/1999 | Huang .......................... | 320/115 |
| 6,290,534 B1 | * | 9/2001 | Sadler .......................... | 439/534 |
| 6,490,186 B2 | * | 12/2002 | Cho ............................. | 363/144 |
| 6,528,969 B2 | * | 3/2003 | Tung et al. .................. | 320/103 |

* cited by examiner

*Primary Examiner*—Lawrence Luk
(74) *Attorney, Agent, or Firm*—Rosenberg, Klein & Lee

(57) ABSTRACT

A portable multi-function charger for electronic devices comprises a body, a circuit section, an input end, an output end, an output cord and a battery connector. The body has a cavity therein to receive the circuit section. The circuit section has a circuit board therein and having a plurality of spring contacts. The input end, the output end, the output cord and the battery connector are connected to the circuit board. A mounting stage is arranged on outer surface of the body and has a plurality of contacts therein. The multi-function charger can be electrically connected to notebook computer, wall socket, vehicle charger or battery for inputting electric power. The inventive multi-function charger can be used to simultaneously charge a plurality of portable electronic devices and rechargeable battery.

15 Claims, 19 Drawing Sheets

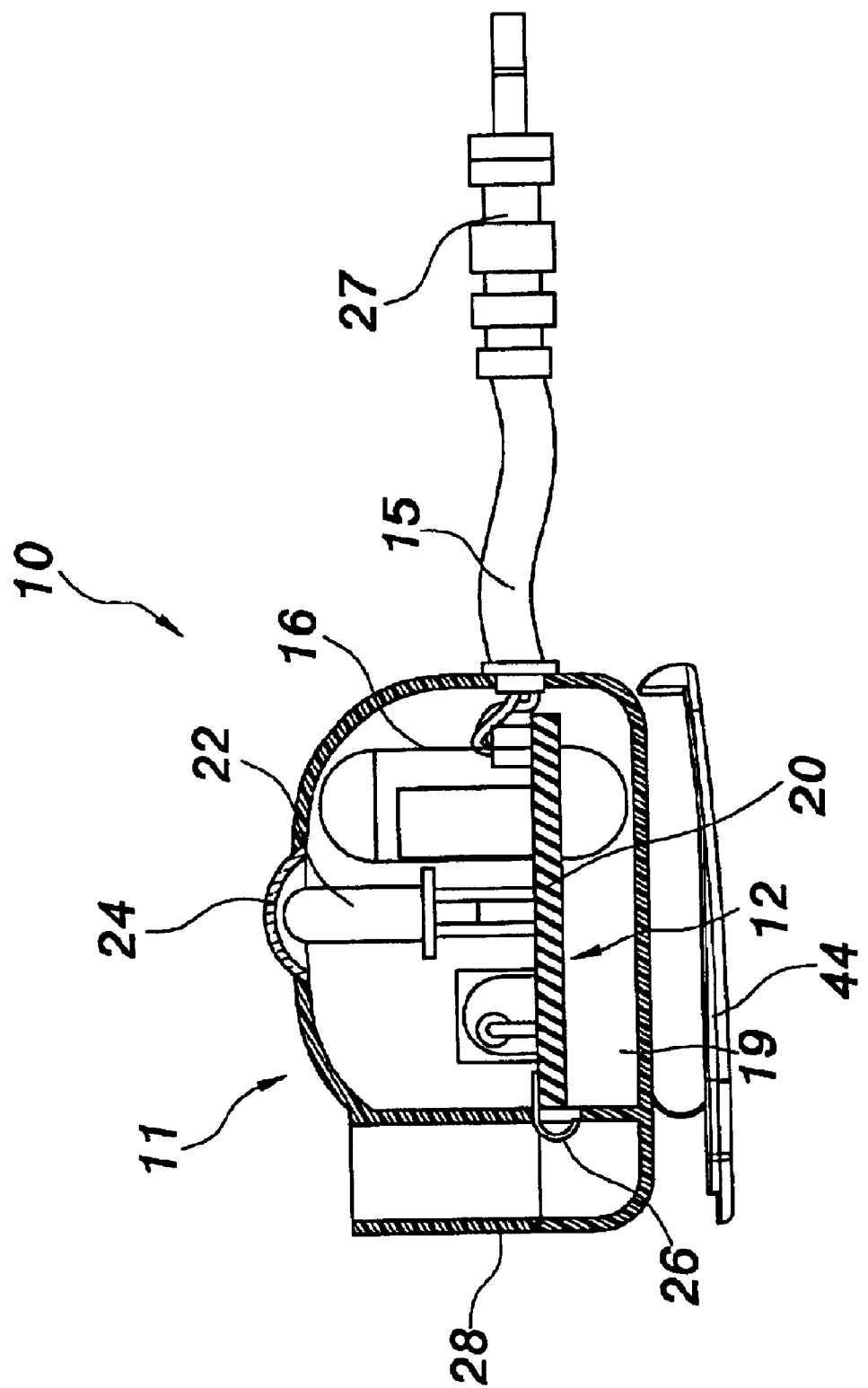

MULTI-FUNCTION CHARGER

FIELD OF THE INVENTION

The present invention relates to a portable multi-function charger, especially to a portable multi-function charger connected to notebook computer, wall socket, vehicle power socket and battery to supply electric power to electronic devices or charge the rechargeable battery.

BACKGROUND OF THE INVENTION

The portable electronic devices such as notebook computers, cellulous phones and PDA become indispensable to modern people. Consequently, the portable electronic devices require rechargeable battery (such as Li battery, NiH battery or NiCd battery) for electric power and a charger is needed to charge the rechargeable battery.

However, the conventional charger has only limited charging function. For example, the conventional charger generally cannot perform charging operation for multiple batteries.

SUMMARY OF THE INVENTION

It is the object of the present invention to provide a portable multi-function charger, which can be electrically connected to portable electronic device, wall socket, vehicle charger or battery for inputting electric power. Therefore, the multi-function charger has flexible electric power sources. The inventive multi-function charger can be used to simultaneously charge a plurality of portable electronic devices and rechargeable battery and has compact size for convenience of carrying.

To achieve above object, the present invention provides a portable multi-function charger for electronic devices comprising a body, a circuit section, an input end, an output end, an output cord and a battery connector. The body has a cavity therein to receive the circuit section. The circuit section has a circuit board therein and having a plurality of spring contacts. The input end, the output end, the output cord and the battery connector are connected to the circuit board. A mounting stage is arranged on outer surface of the body and has a plurality of contacts therein.

The various objects and advantages of the present invention will be more readily understood from the following detailed description when read in conjunction with the appended drawing, in which:

BRIEF DESCRIPTION OF DRAWING

FIG. 19 shows a sectional view of the eighth preferred embodiment of the present invention.

DETAILED DESCRIPTION OF THE INVENTION

Figure 1:
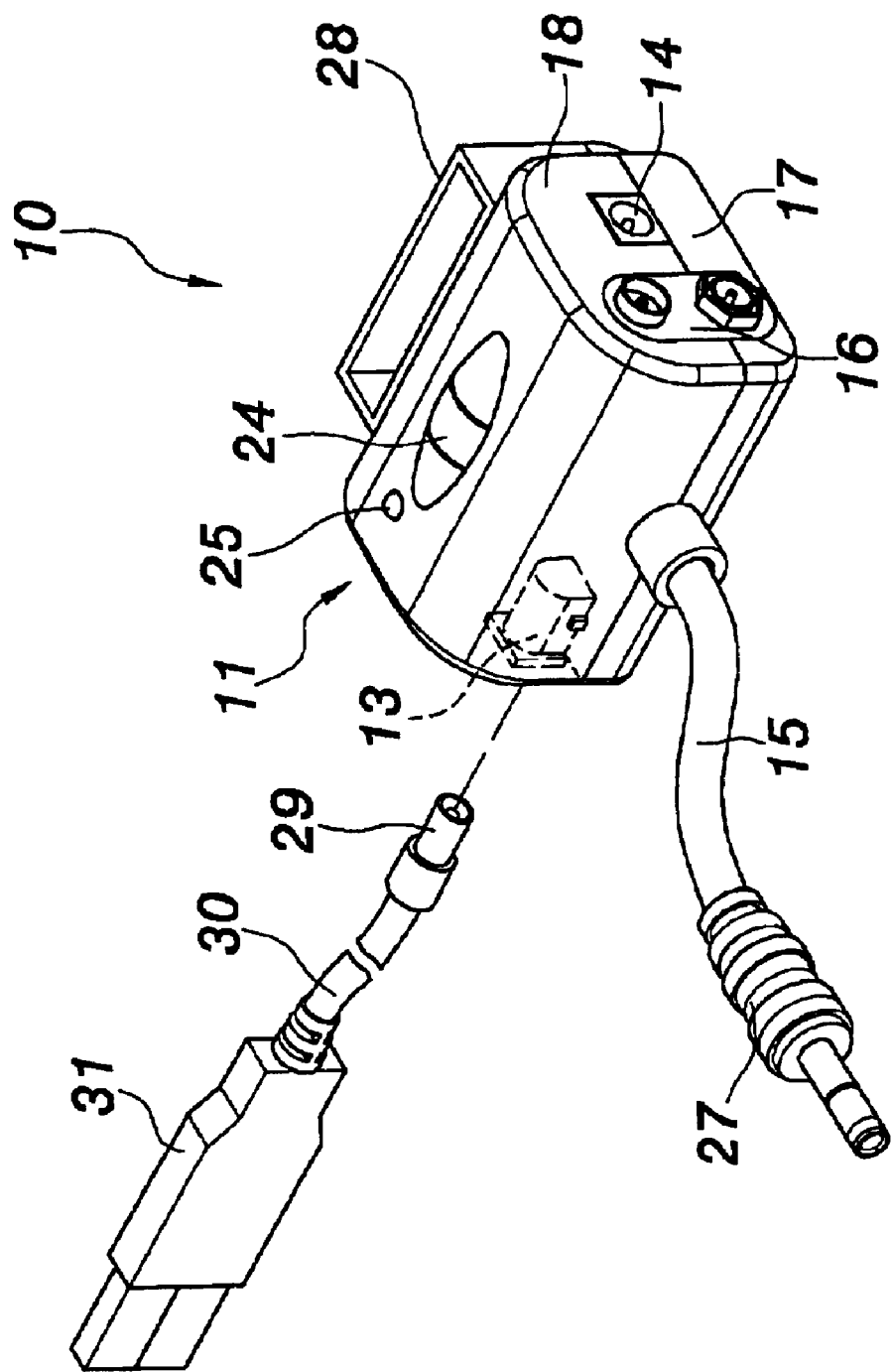
FIG. 1 shows a perspective view of a first preferred embodiment of the present invention.
Figure 2:
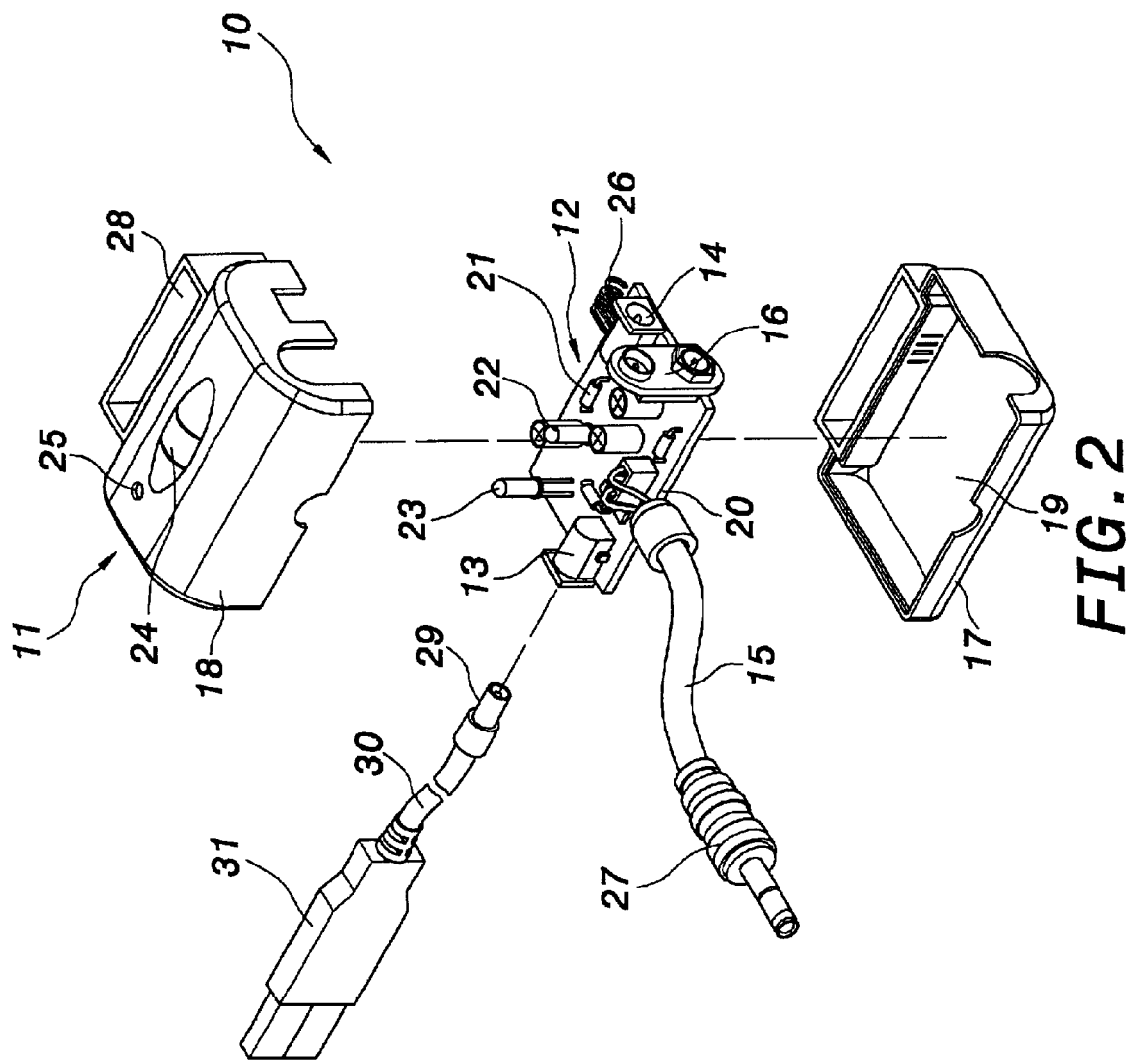
FIG. 2 shows an exploded view of the first preferred embodiment of the present invention.
Figure 3:
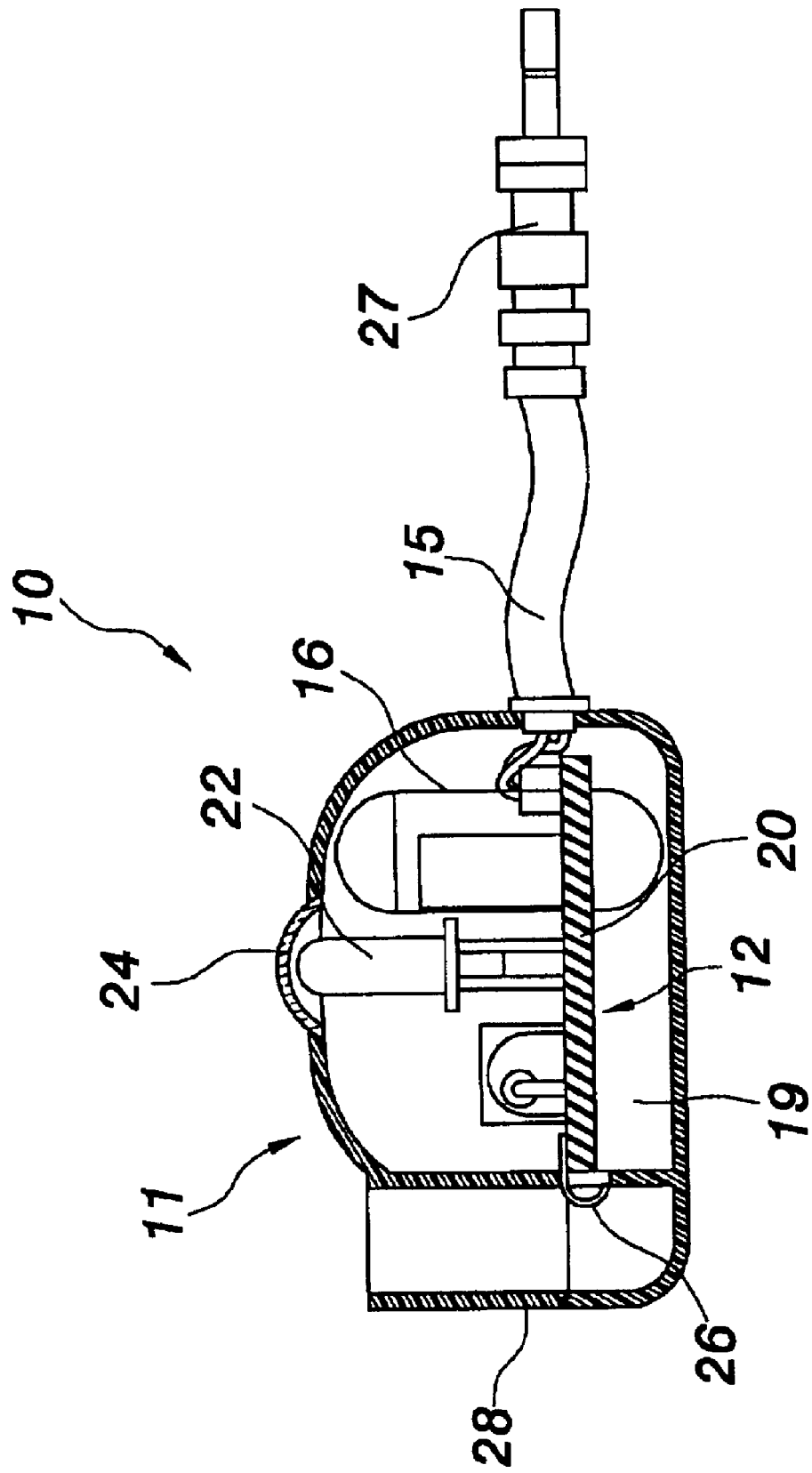
FIG. 3 shows a sectional view of the first preferred embodiment of the present invention.

With reference to FIGS. 1, 2 and 3, the present invention is intended to provide a portable multi-function charger for electronic devices. The multi-function charger 10 according to the present invention comprises a body 11, a circuit section 12, an input end 13, an output end 14, an output cord 15 and a battery connector 16. The body 11 is a hollow case composed of a first half 17 and a second half 18 assembled by locking, screwing, supersonic welding. The body 11 has a cavity 19 therein to receive the circuit section 12.

The circuit section 12 is composed of a circuit board 20 and a plurality of electric components 21. The circuit board 20 is received in the cavity 19 and has a plurality of indication lamps 22, 23 thereon. The indication lamps 22, 23, for example, can be LED or light bulbs and are used for status indication, or lightening and warming function. The body 11 has transparent mask 24 and through hole 25 corresponding to the indication lamps 22, 23 to facilitate the light emission of the indication lamps 22, 23. Moreover, the circuit board 20 has a plurality of spring contacts 26 electrically connected thereto.

The input end 13, the output end 14, the output cord 15 and the battery connector 16 are connected to the circuit board 20. The output cord 15 is also connected to a plug 27 connected to a portable device such as a cellulous phone. The input end 13 is connected to a plug 29 of an input cord 30, which is also connected to a USB connector 31.

The body 11 has a mounting chamber 28 on outer surface thereof and the mounting chamber 28 can be integrally formed with the body 11 by injection molding or detachably assembled to the body 11. In this preferred embodiment, the mounting chamber 28 is integrally formed with the body 11. The mounting chamber 28 can be arbitrary shape with open topside such that rechargeable battery can be placed within the mounting chamber 28. One end of each spring contact 26 extends into the mounting chamber 28.

Figure 4:
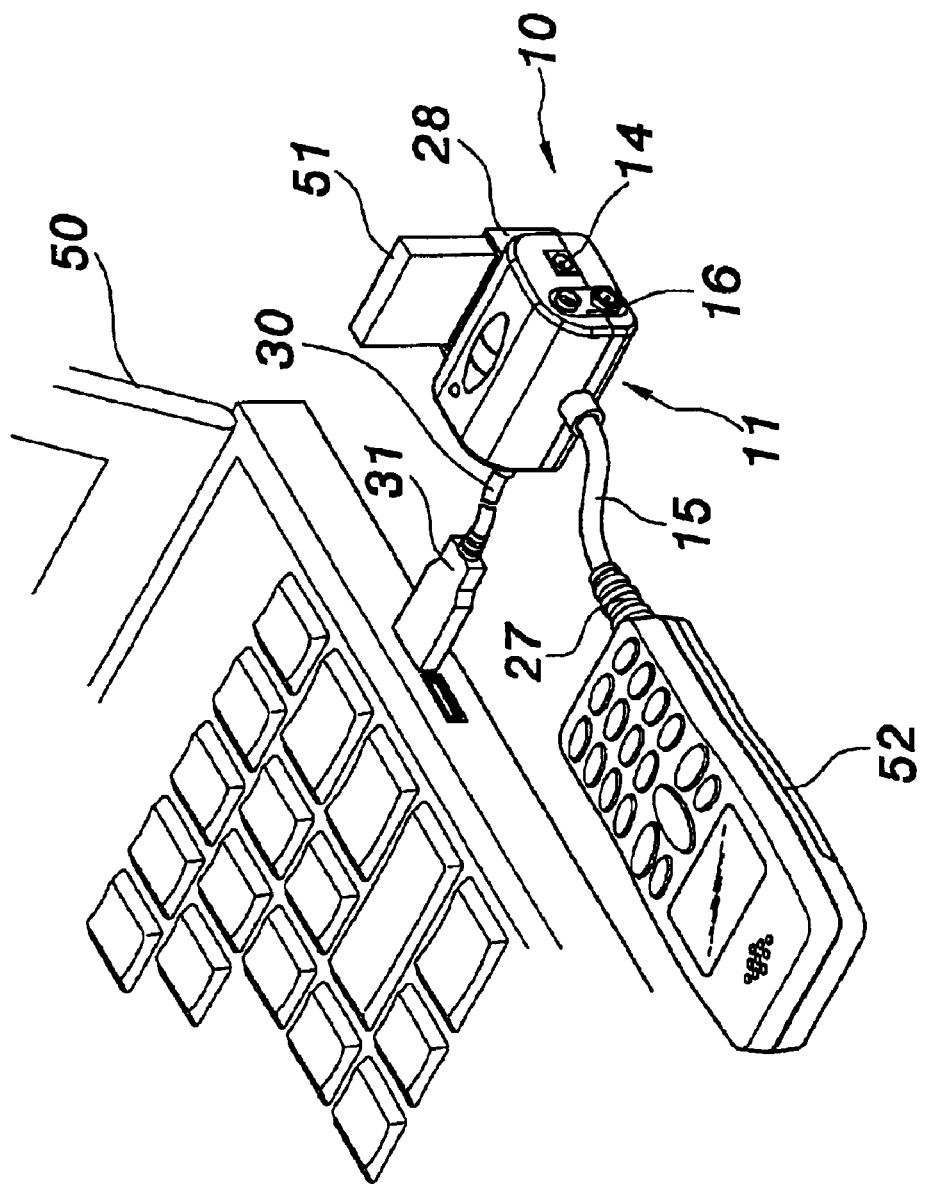
FIG. 4 is a view showing the operation of the first preferred embodiment of the present invention.

With reference to FIG. 4, the USB connector 31 on the input cord 30 is plugged to the DC power output port of a portable electronic device 50 such as a notebook. Therefore the input end 13 is electrically connected to the portable electronic device 50 to provide electric power to the multi-function charger 10. The rechargeable battery 51 to be charged is placed in the mounting chamber 28 such that the contacts of rechargeable battery are in contact with the spring contacts 26 and the rechargeable battery 51 can be charged through the spring contacts 26. Therefore, the portable multi-function charger can be functioned as a charging stage.

Moreover, a portable electronic device 52 to be charged can be connected to the plug 27 of the output cord 15 such that the portable electronic device 52 can be charged through the plug 27. Therefore, the portable multi-function charger can be functioned as a traveling charging suit.

Figure 5:
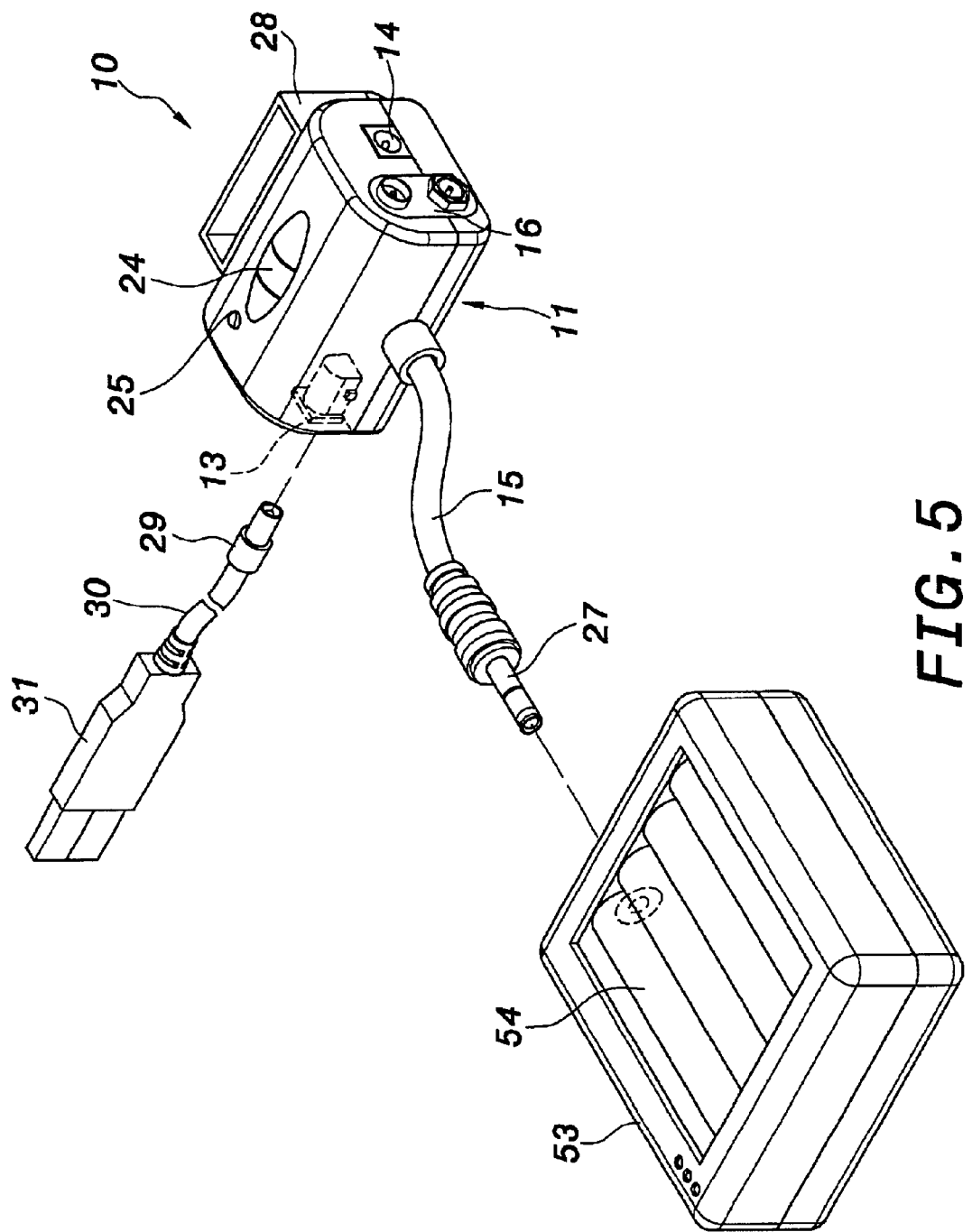
FIG. 5 is another view showing the operation of the first preferred embodiment of the present invention.

With reference to FIG. 5, the plug 27 of the output cord 15 can be connected to another charger 53 to charge the rechargeable battery 54 placed in the charger 53.

Figure 6:
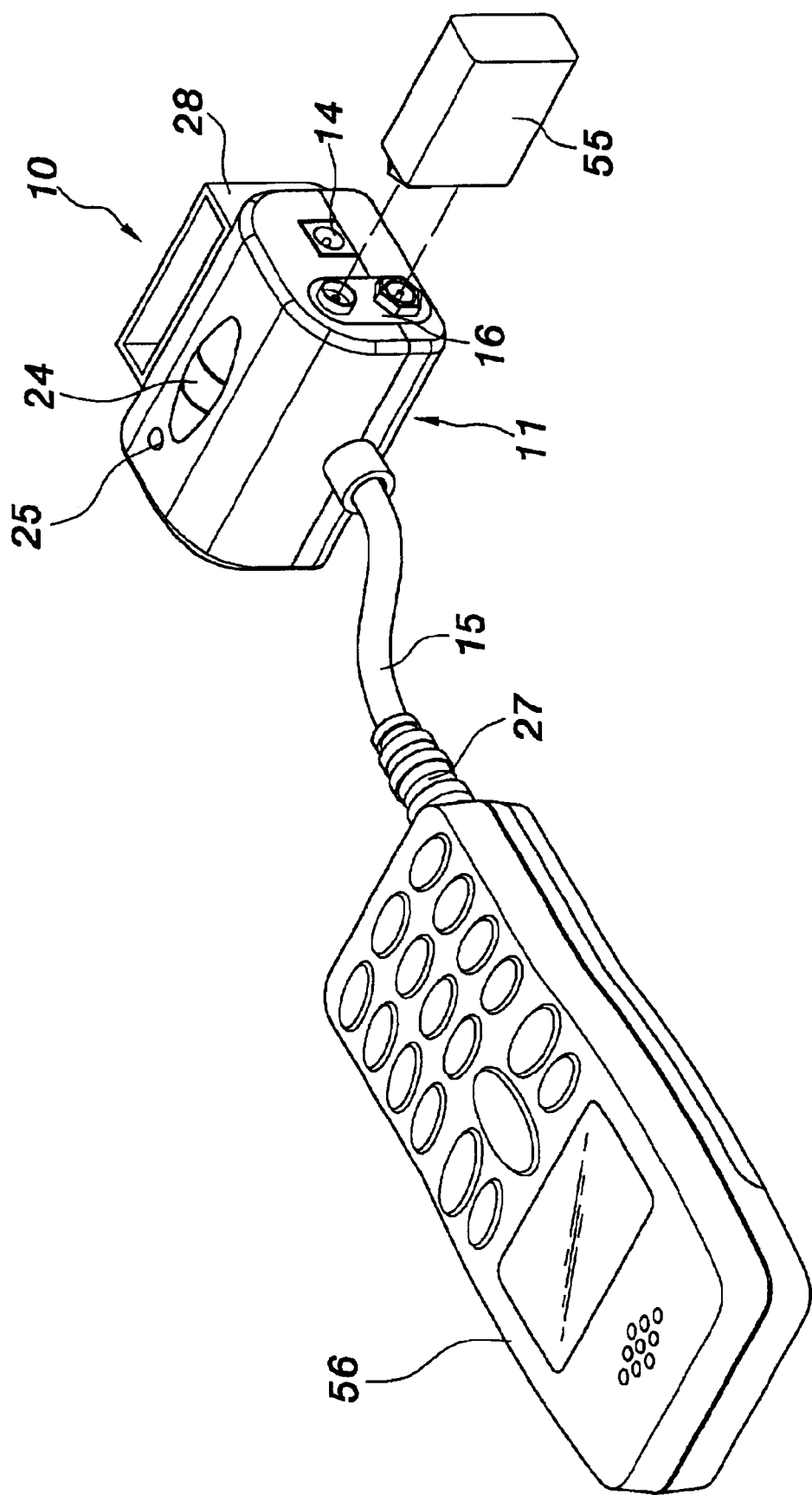
FIG. 6 is another view showing the operation of the first preferred embodiment of the present invention.

With reference to FIG. 6, the battery connector 16 is connected to commercially available dry battery 55 and the portable electronic device 56 to be charged is connected to the plug 27 of the output cord 15 such that the multi-function charger 10 is powered by the dry battery 55 and can charge the portable electronic device 56 to be charged. Therefore, the portable multi-function charger 10 can be functioned as a traveling charging suit.

Figure 7:
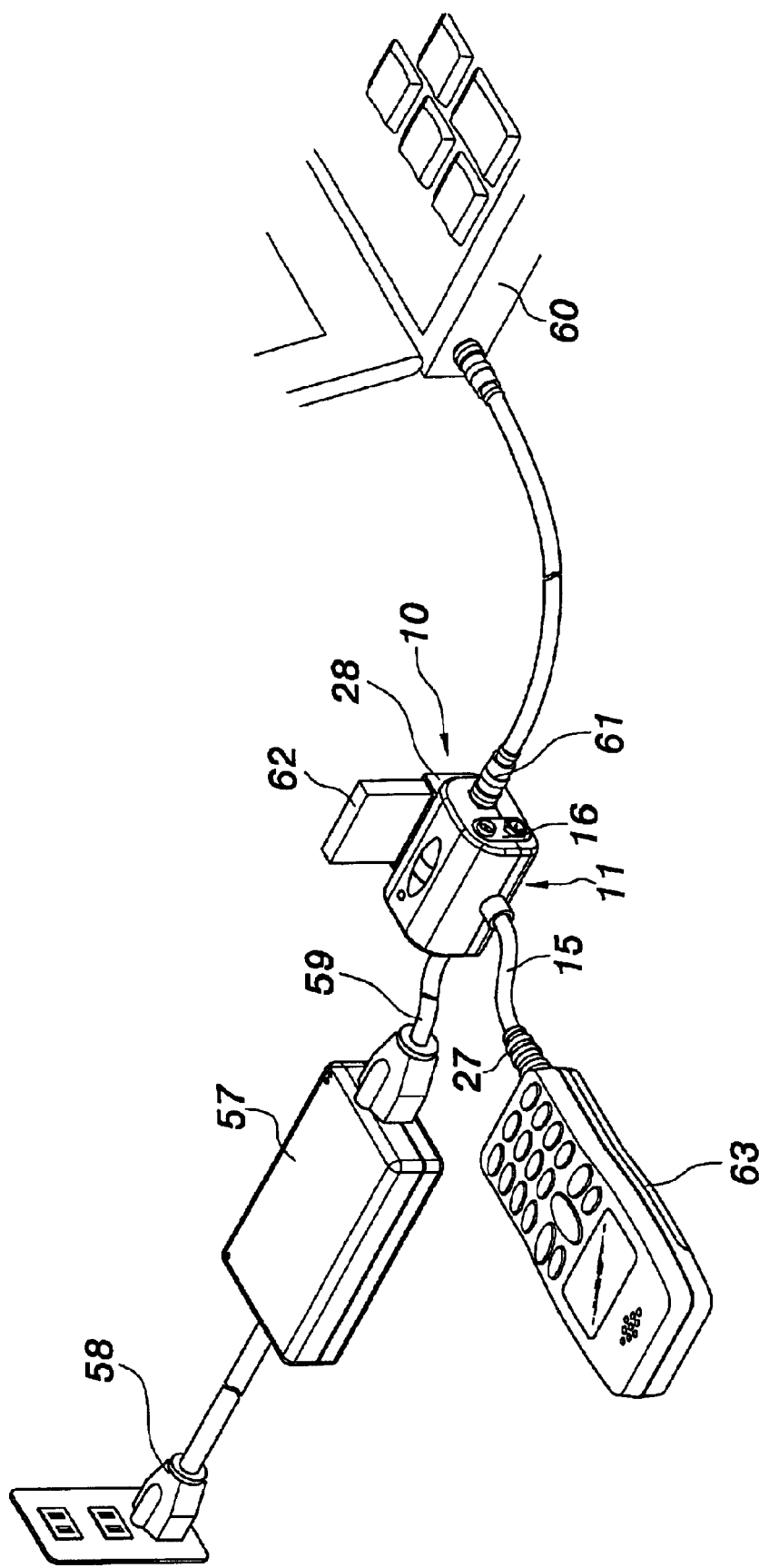
FIG. 7 is another view showing the operation of the first preferred embodiment of the present invention.

With reference to FIG. 7, a commercially available power adapter 57 can be plugged to an 110V (220V) AC power source through a plug 58 thereof to convert an AC electric power to a DC electric power. The input end 13 of the inventive multi-function charger 10 is electrically connected to the power adapter 57 through an input cord 59 and then a plug 61 of a portable electronic device 60 such as a notebook computer is connected to the output end 14 of the multi-function charger 10. Therefore, the DC power converted by the power adapter 57 can be supplied to the portable electronic device 60 through the multi-function charger 10 or used to charge the rechargeable battery of the portable electronic device 60 through the multi-function charger 10.

At the same time, a rechargeable battery 62 to be charged can be placed into the mounting chamber 28 such that the contacts of rechargeable battery are in contact with the spring contacts 26 and the rechargeable battery 51 can be charged through the spring contacts 26. Moreover, another portable electronic device 63 to be charged is connected to the plug 27 of the output cord 15 such that the portable electronic device 63 can be charged through the plug 27.

Figure 8:
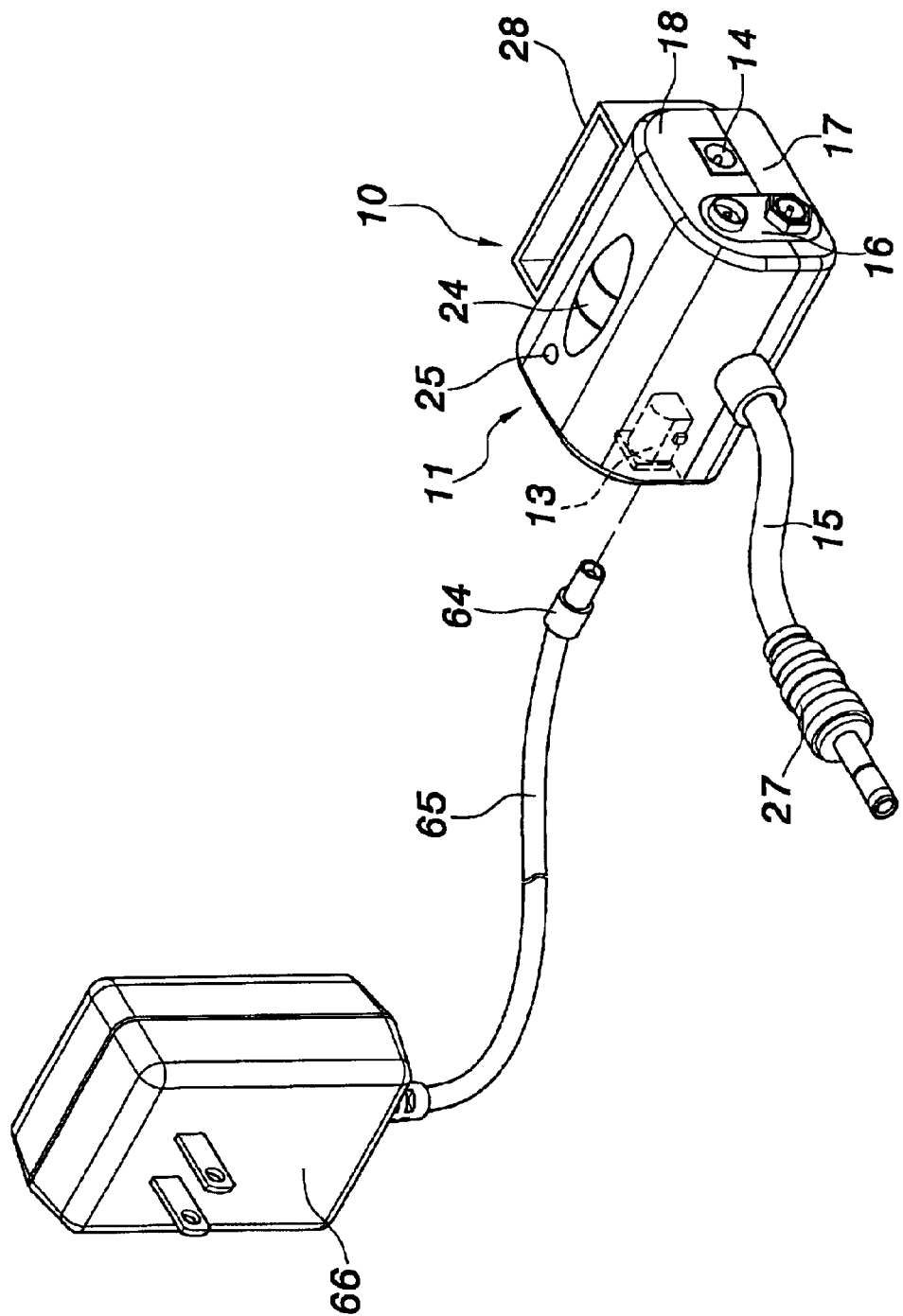
FIG. 8 is another view showing the operation of the first preferred embodiment of the present invention.
Figure 9:
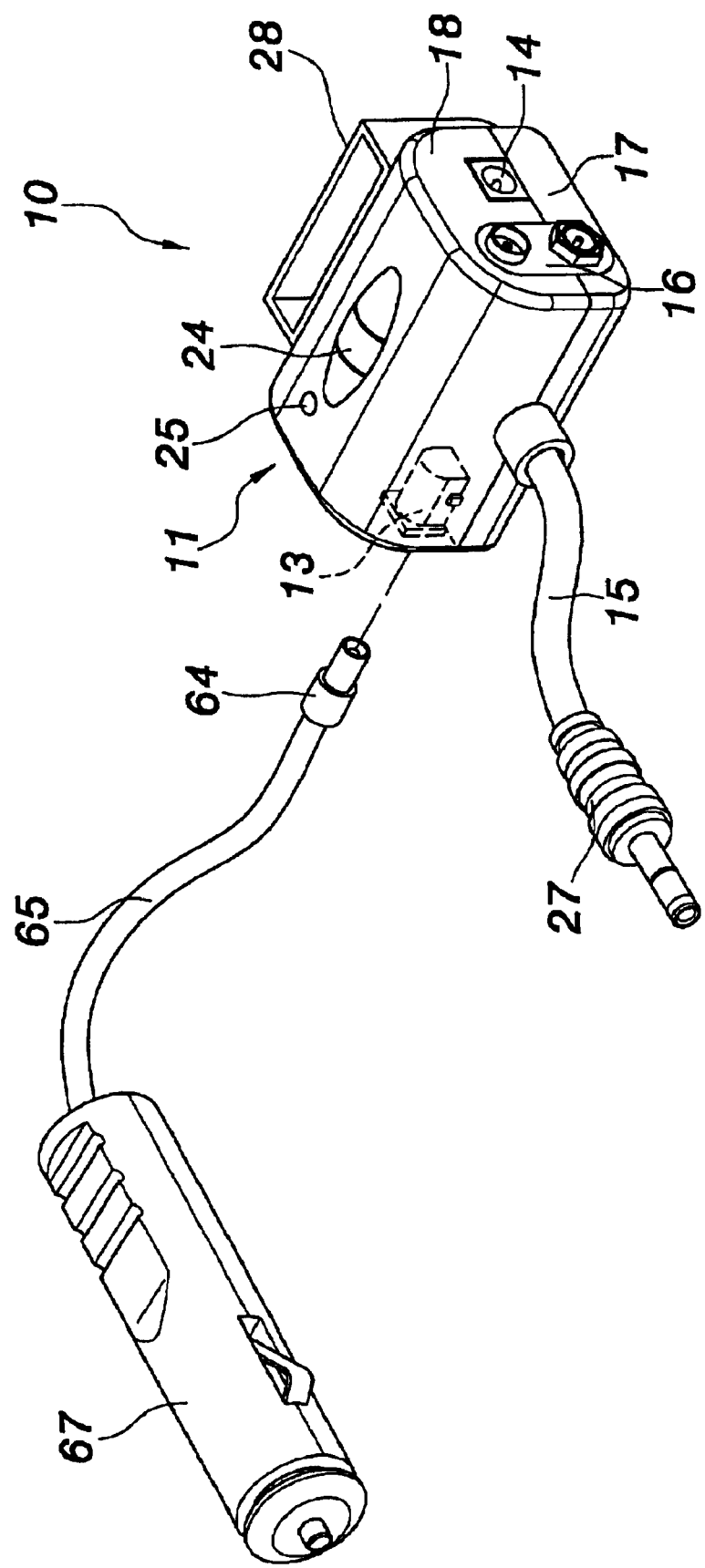
FIG. 9 is another view showing the operation of the first preferred embodiment of the present invention.

With reference to FIGS. 8 and 9, the input end 13 of the inventive multi-function charger 10 is electrically connected to a plug 64 and the plug 64 is connected to an adapter plug 66 through an input cord 65. The adapter plug 66 can be connected to an 110V (220V) AC power source as shown in FIG. 8. Moreover, the plug 64 is connected to a vehicle charger plug 67 through an input cord 65 as shown in FIG. 9. Therefore, the multi-function charger 10 can be powered by DC power through the vehicle charger plug 66.

Moreover, the input end 13 of the inventive multi-function charger 10 can be electrically connected to portable electronic device such as notebook computer, wall socket, vehicle charger for inputting electric power, or connected to dry battery through the battery connector 16 to acquire DC electric power. Therefore, the inventive multi-function charger 10 has flexible electric power sources. The inventive multi-function charger 10 can be used to simultaneously charge a plurality of portable electronic devices and rechargeable battery and has compact size for convenience of carrying.

Figure 10:
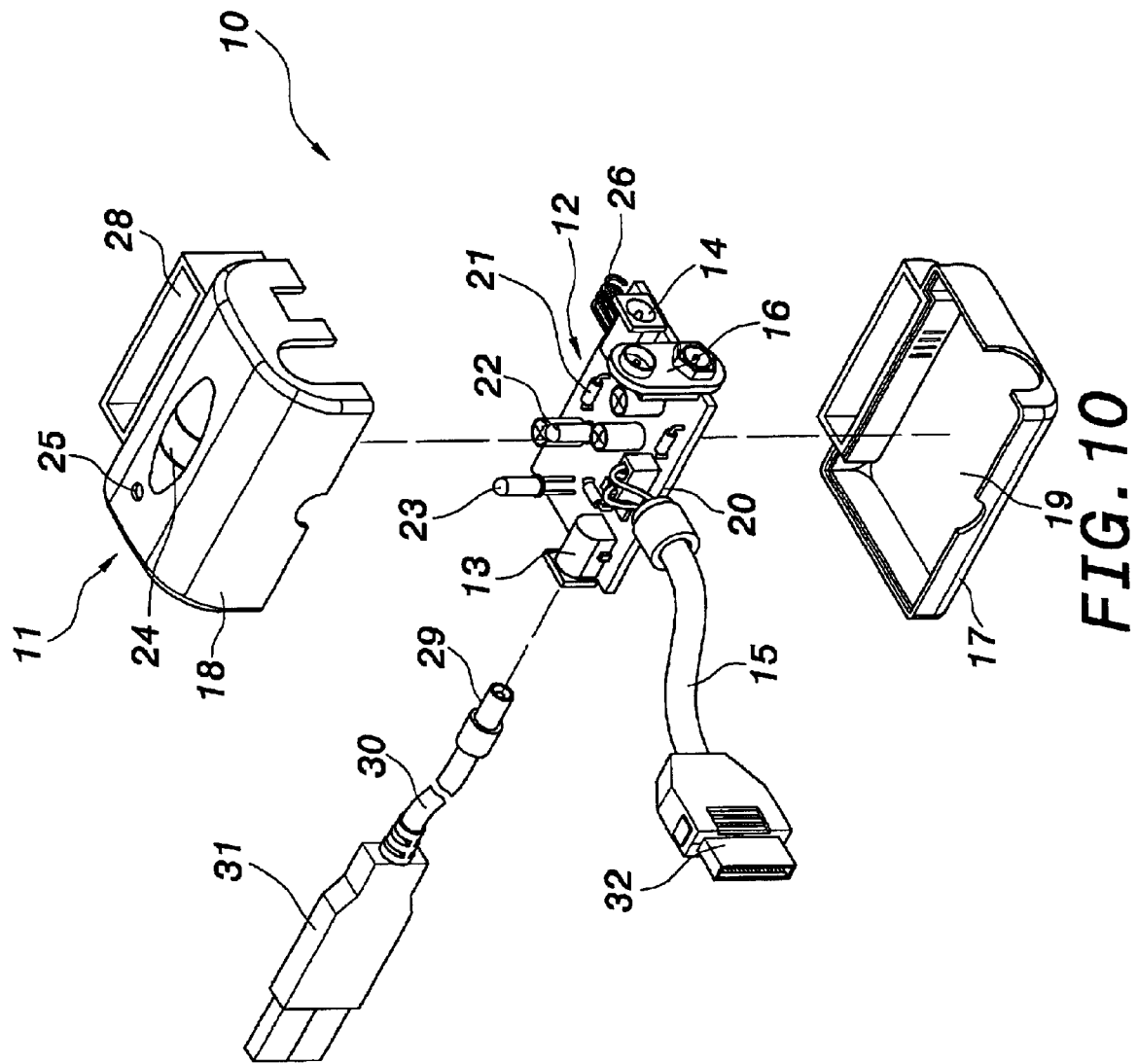
FIG. 10 shows an exploded view of a second preferred embodiment of the present invention.

As can be shown in FIG. 10, the output cord 15 of the inventive multi-function charger 10 can also be connected to plugs or connectors 32 of various types.

Figure 11:
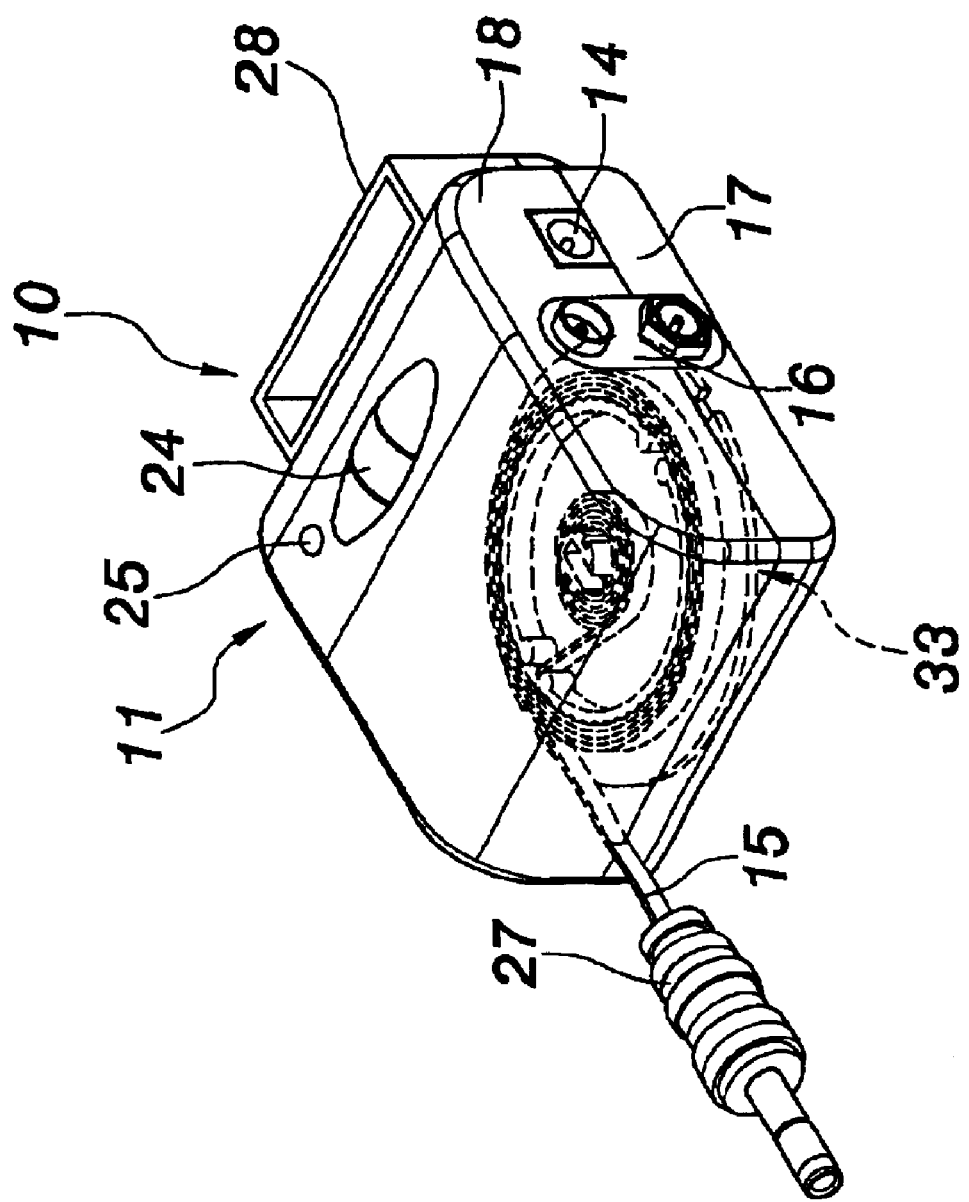
FIG. 11 shows a perspective view of a third preferred embodiment of the present invention.

With reference to FIG. 11, the body 11 contains a spool unit 33 and the output cord 15 is a flat cable wrapped around the spool unit 33. Therefore, the output cord 15 can be scrolled into the body 11 or pulled out of the body 11. The output cord 15 will not have the problem of overlong or over short length.

Figure 12:
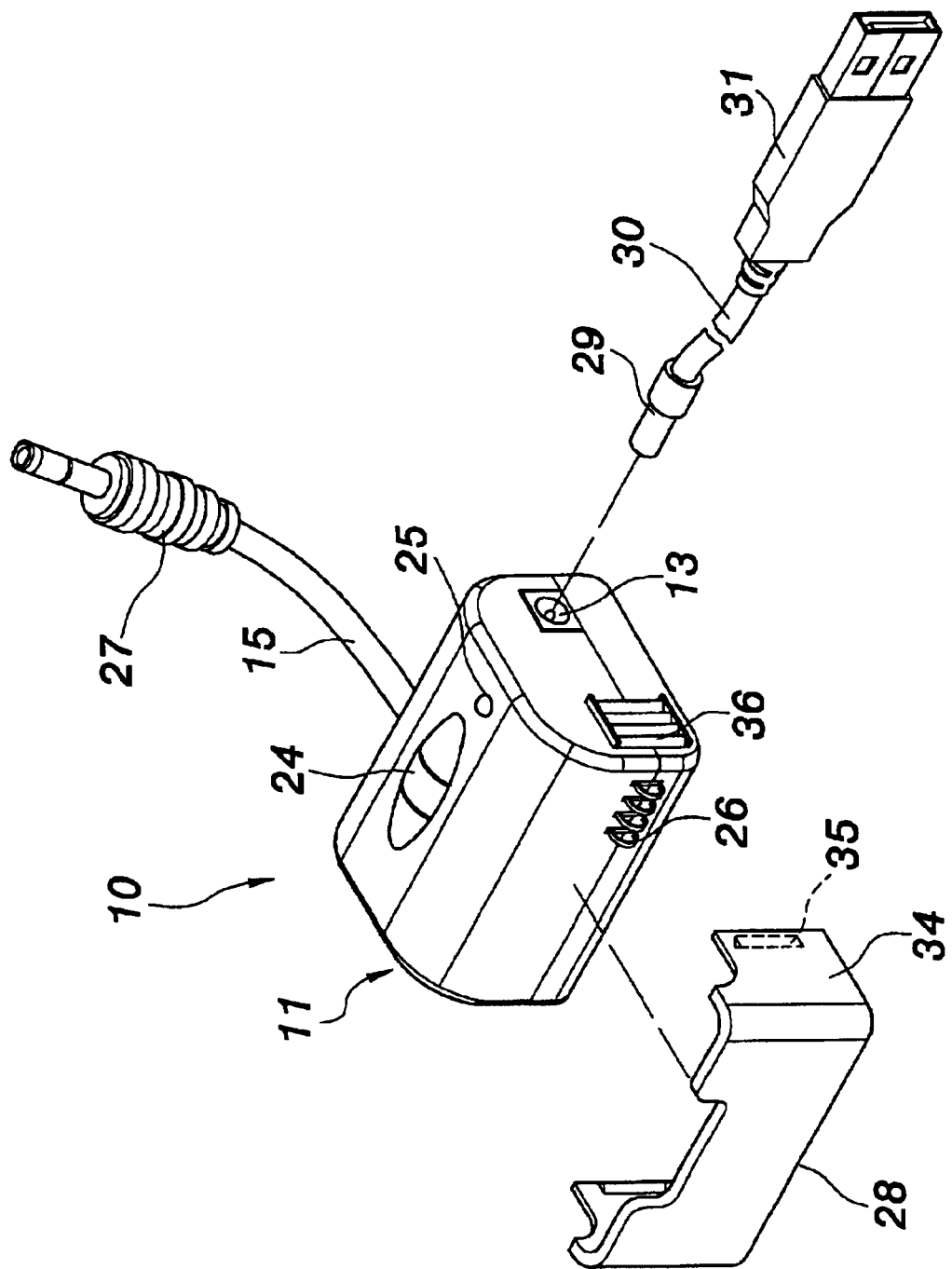
FIG. 12 shows an exploded view of a fourth preferred embodiment of the present invention.
Figure 13:
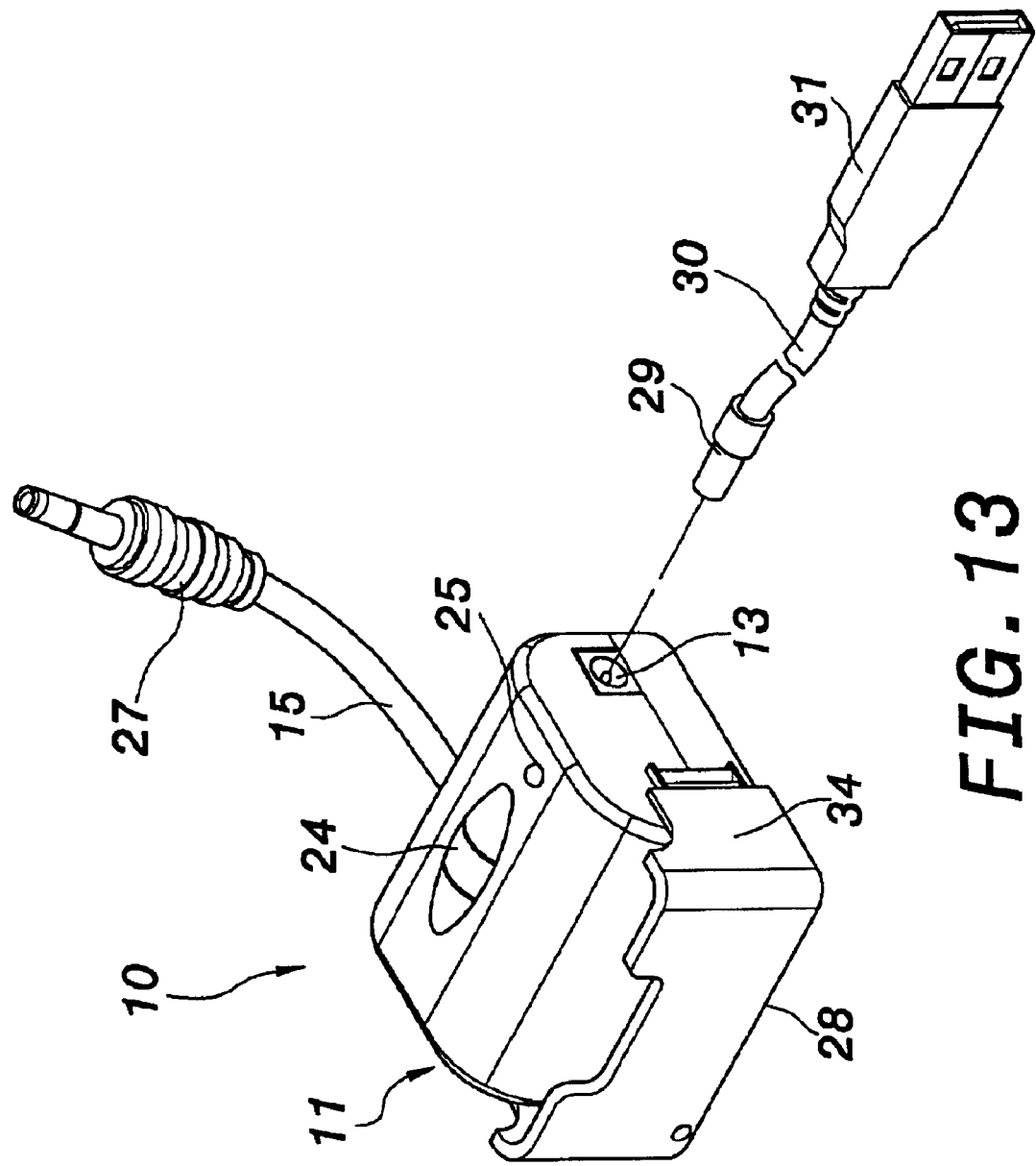
FIG. 13 shows a perspective view of the fourth preferred embodiment of the present invention.

With reference to FIGS. 12 and 13, the mounting chamber 28 according to the present invention can be detachably assembled to the body 11. The mounting chamber 28 has two connection tabs 34 on both sides thereof and each of the connection tabs 34 has a clamping section 35 therein. The body 11 has at least one clamping tooth 36 on both sides thereof resiliently engaged with the clamping section 35 such that the mounting chamber 28 is adjustably arranged on the body 11. The mounting chamber 28 can be pulled out or pushed in with respect to body 11 to adjust a receiving space therein and to accommodate batteries of various sizes. Moreover, the mounting chamber 28 can be detached from the body 11 when not being used, or pressed downward to reduce size. Moreover, the mounting chamber 28 can also be designed to be movable in altitude direction to fit batteries of various heights and the size thereof can be further reduced when not being used.

Figure 14:
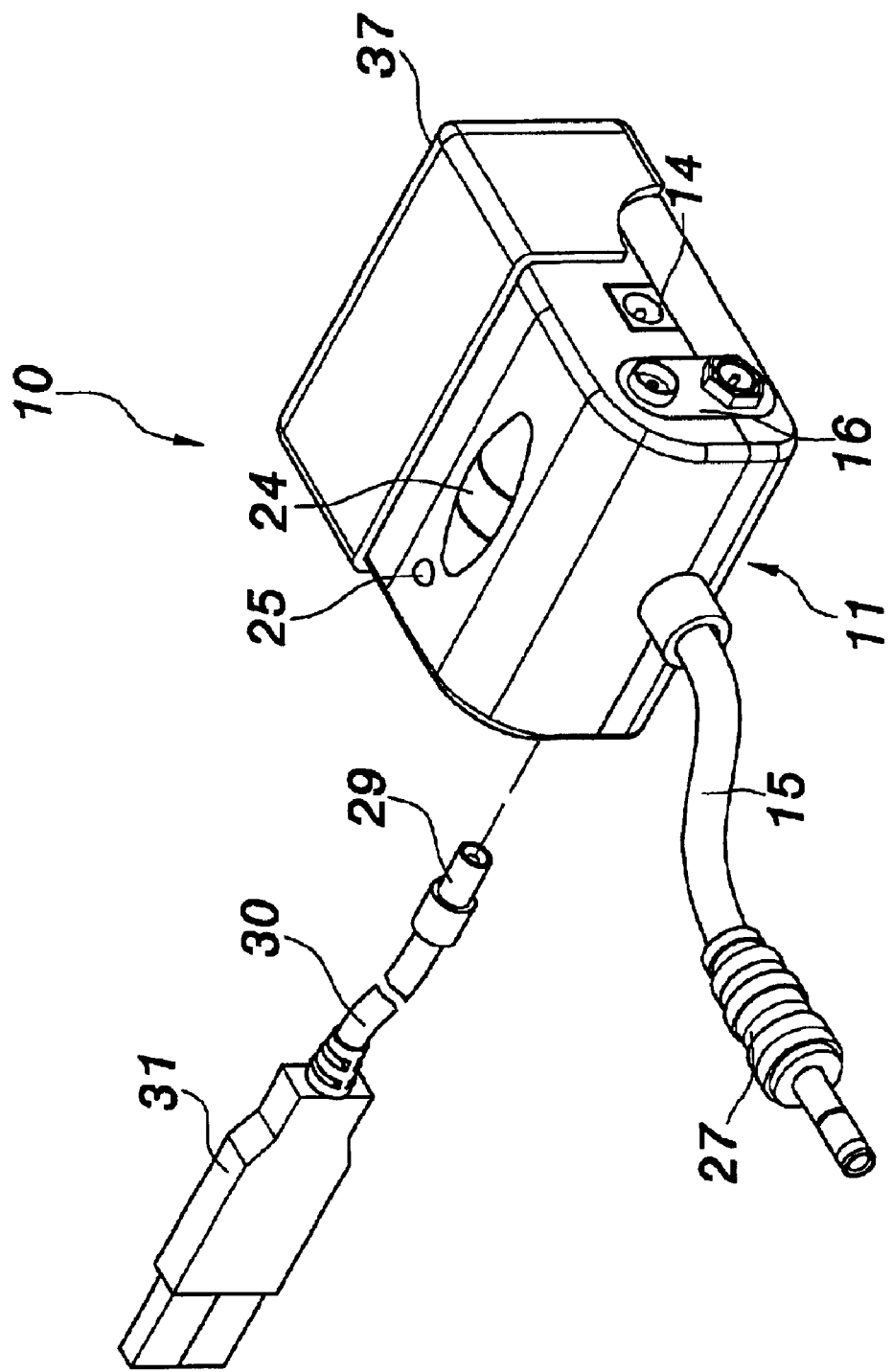
FIG. 14 shows a perspective view of a fifth preferred embodiment of the present invention.
Figure 15:
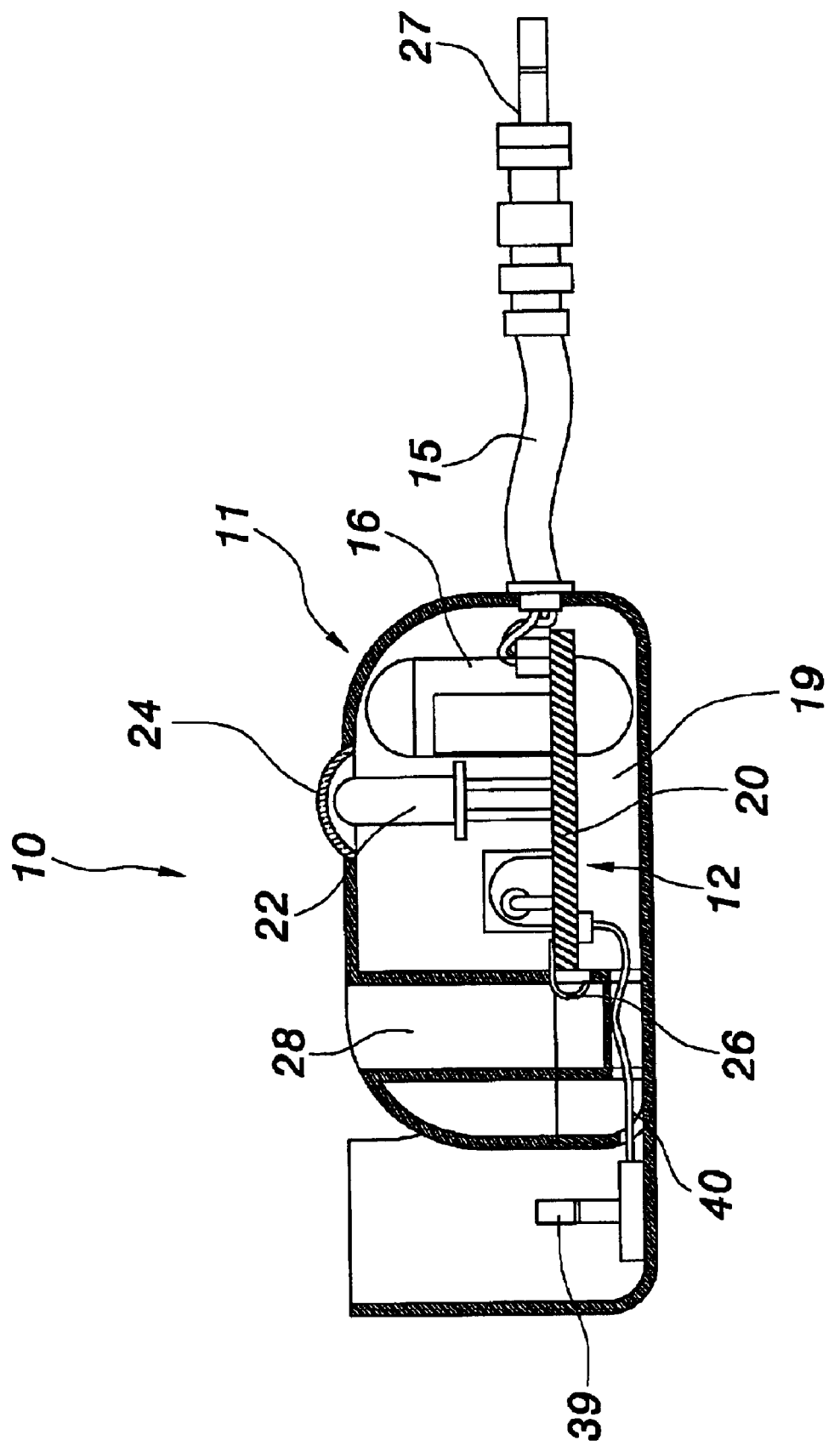
FIG. 15 shows a sectional view of the fifth preferred embodiment of the present invention.
Figure 16:
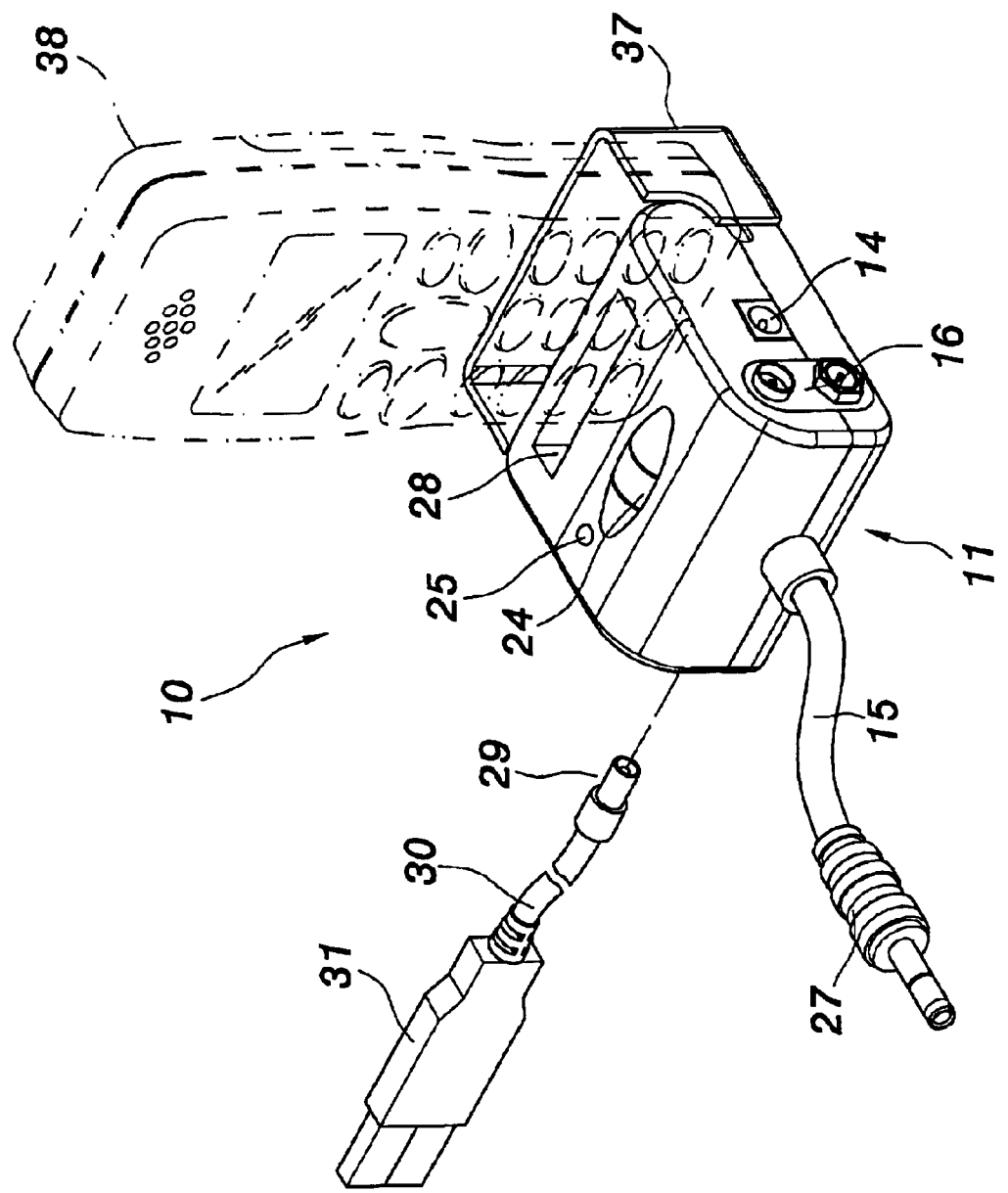
FIG. 16 is a view showing the operation of the fifth preferred embodiment of the present invention.

With reference to FIGS. 14, 15 and 16, the body 11 has a foldable mounting chamber 37 pivotally arranged on outer side thereof. The mounting chamber 37 is a hollow shell with arbitrary shape and open topside such that a portable electronic device 38 can be inserted into the mounting chamber 37 from its top opening. The mounting chamber 37 has a plurality of contacts 39 therein and connected to the circuit board 20 through conductive wires 40. When the portable electronic device 38 is placed into the foldable mounting chamber 37, the contacts thereof are in contact with the contacts 39 and electrical power is sent to the portable electronic device 38 through the contacts 39. Moreover, when the foldable mounting chamber 37 is not in use, the foldable mounting chamber 37 can be folded upward and cover on the body 11 to save space as shown in FIG. 14.

Figure 17:
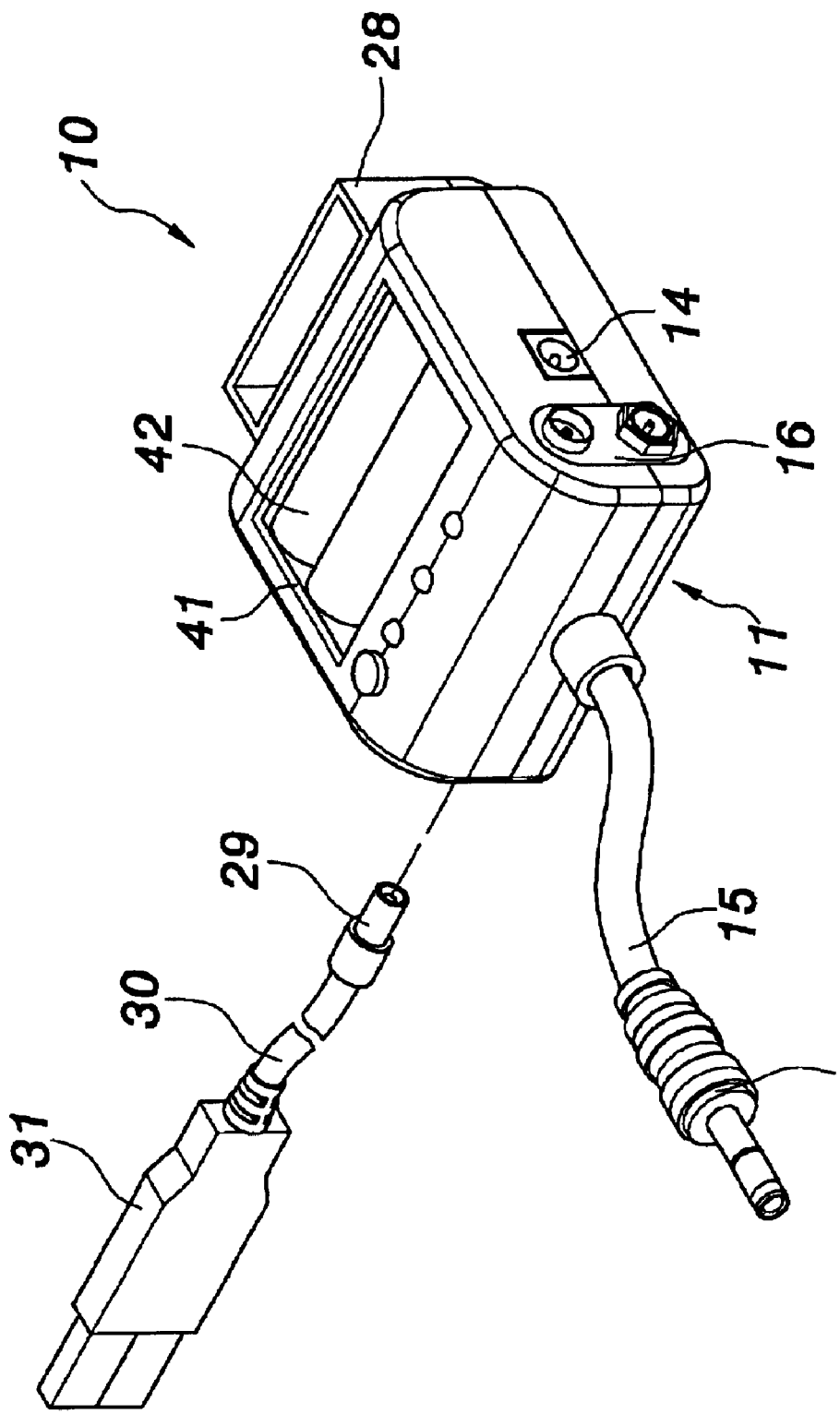
FIG. 17 shows a perspective view of a sixth preferred embodiment of the present invention.

With reference to FIG. 17, the body 11 has an accommodation groove 41 on top surface thereof and the accommodation groove 41 has open topside to receive batteries therein. The accommodation groove 41 has a plurality of contacts therein and connected to the circuit board 20. When the batteries 42 are inserted into the accommodation groove 41, the batteries 42 are in contact with the contacts of the accommodation groove 41 and can be charged through the contacts of the accommodation groove 41.

Figure 18:
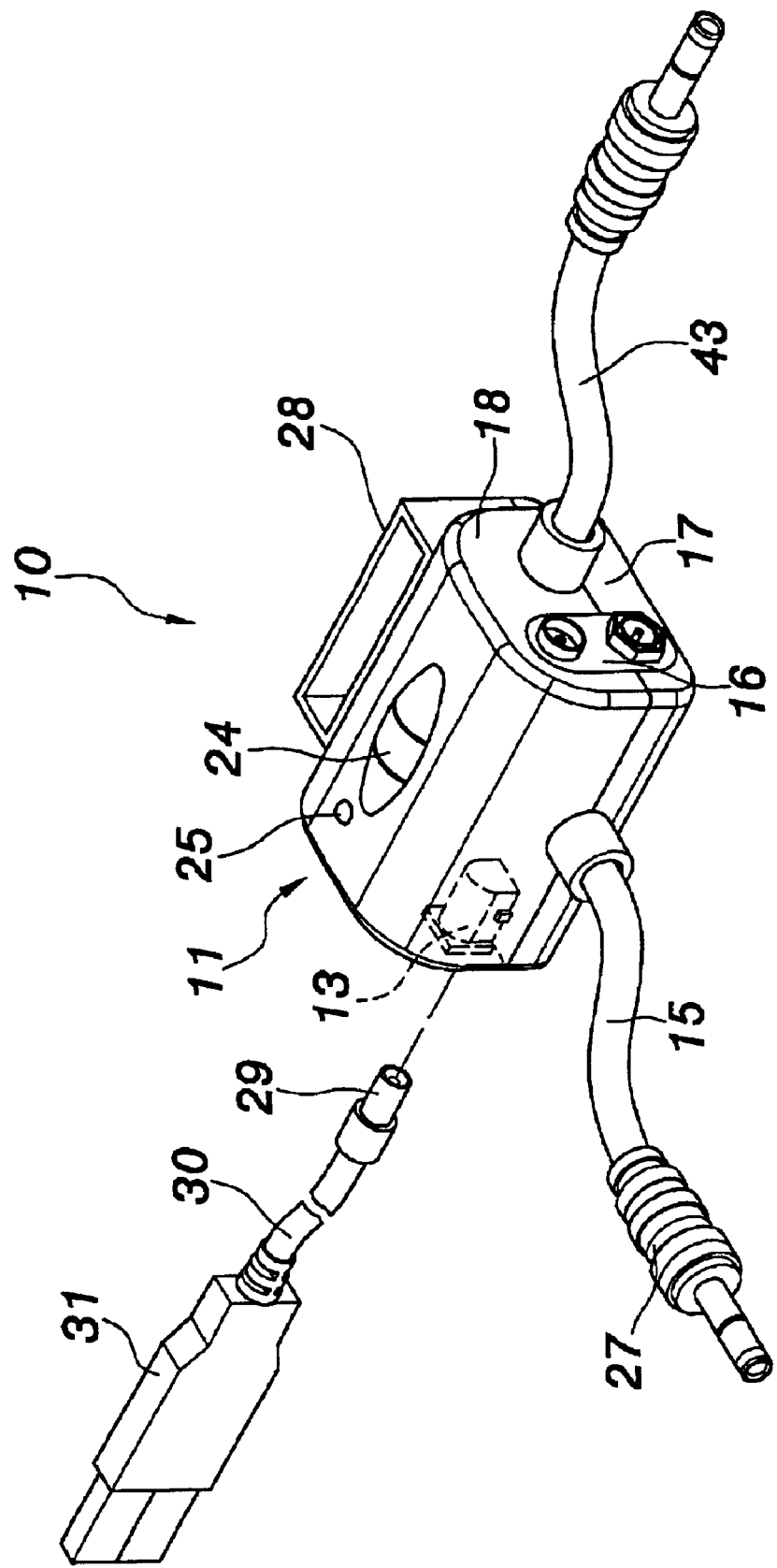
FIG. 18 shows a perspective view of a seventh preferred embodiment of the present invention.

With reference to FIG. 18, the circuit board 20 of the circuit section 12 has an output cord 43, by which the circuit board 20 can be connected to other portable electronic devices.

With reference to FIG. 18, the body 11 has a clip 44 on outer surface thereof and being able to clamp on belt of user for carrying.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A portable multi-function charger, comprising:

a body having a cavity therein;

a circuit section arranged in the cavity and having a circuit board with a plurality of spring contacts;

at least one input, an output socket, and an output cord each connected to the circuit board for detachably coupling a portable device to the circuit section, and a mounting stage connected to the body with the plurality of spring contacts extending into the mounting stage, wherein the output socket, the output cord and the plurality of spring contacts provide for simultaneous charging of a plurality of portable devices.

2. The portable multi-function charger as in claim 1, wherein the body contains a spool unit therein and the output cord is wrapped around the spool unit.

3. The portable multi-function charger as in claim 1, wherein the body has a foldable mounting stage pivotally arranged thereon, the mounting stage being a hollow shell with contacts therein and connected to the circuit board.

4. The portable multi-function charger as in claim 1, wherein the body has an accommodation groove thereon, the accommodation groove having open topside and having contacts connected to the circuit board.

5. The portable multi-function charger as in claim 1, wherein the body has a clip on outer surface thereof.

6. The portable multi-function charger as in claim 1, wherein the circuit board is connected to an output end.

7. The portable multi-function charger as in claim 1, wherein the board is connected to an output cord.

8. The portable multi-function charger as in claim 1, wherein the circuit board has a plurality of indication lamps thereon and the body has transparent mask and through holes corresponding to the indication lamps.

9. The portable multi-function charger as in claim 1, wherein the board is connected to a battery connector.

10. A portable multi-function charger, comprising:

a body having a cavity therein;

a circuit section arranged in the cavity and having a circuit board with a plurality of spring contacts;

an input end and an output cord connected to the circuit board for detachably coupling a portable device to the circuit section, the input end being connected to a plug, the plug being connected to a connector through an input cord; and, a mounting stage connected to the body and the spring contacts extending into the mounting stage, wherein the output cord and the plurality of spring contacts provide for simultaneous charging of a plurality of portable devices.

11. The portable multi-function charger as in claim 10, wherein the output cord is also connected to a plug.

12. A portable multi-function charger, comprising:

a body having a cavity therein;

a circuit section arranged in the cavity and having a circuit board with a plurality of spring contacts;

an input end and an output cord connected to the circuit board for detachably coupling a portable device to the circuit section; and, a mounting stage connected to the body and the spring contacts extending into the mounting stage, wherein the output cord and the plurality of spring contacts provide for simultaneous charging of a plurality of portable devices.

13. The portable multi-function charger as in claim 12, wherein the mounting stage is detachably assembled to an outer surface of the body.

14. The portable multi-function charger as in claim 12, wherein the mounting stage is integrally formed on an outer surface of the body.

15. A portable multi-function charger comprising:

a body having a cavity therein;

a circuit section arranged in the cavity and having a circuit board with a plurality of spring contacts;

an input end and an output cord connected to the circuit board; and, a mounting state connected to the body and the spring contacts extending into the mounting stage, the mounting stage being detachably assembled to an outer surface of the body;

wherein the mounting chamber has two connection tabs on both sides thereof and each of the connection tabs has a clamping section therein, the body has at least one clamping tooth on both sides thereof and resiliently engaged with the clamping section such that the mounting chamber is adjustably arranged on the body.

* * * * *